US010629323B2

(12) United States Patent
Mu et al.

(10) Patent No.: US 10,629,323 B2
(45) Date of Patent: Apr. 21, 2020

(54) ELECTRICALLY CONDUCTIVE ADHESIVES

(71) Applicant: DUPONT ELECTRONICS, INC., Wilmington, DE (US)

(72) Inventors: Minfang Mu, Shanghai (CN); Dan Feng, Shanghai (CN); Jose Manuel Rodriguez-Parada, Hockessin, DE (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 0 days.

(21) Appl. No.: 15/754,336

(22) PCT Filed: Aug. 28, 2015

(86) PCT No.: PCT/CN2015/088445
§ 371 (c)(1),
(2) Date: Feb. 22, 2018

(87) PCT Pub. No.: WO2017/035710
PCT Pub. Date: Mar. 9, 2017

(65) Prior Publication Data
US 2018/0237618 A1  Aug. 23, 2018

(51) Int. Cl.
| H01B 1/22 | (2006.01) |
| C09J 9/02 | (2006.01) |
| C09J 11/04 | (2006.01) |
| C08K 3/08 | (2006.01) |
| C08K 9/02 | (2006.01) |

(52) U.S. Cl.
CPC ............... *H01B 1/22* (2013.01); *C08K 9/02* (2013.01); *C09J 9/02* (2013.01); *C09J 11/04* (2013.01); *C08K 2003/085* (2013.01); *C08K 2003/0806* (2013.01); *C08K 2201/001* (2013.01); *C08K 2201/014* (2013.01)

(58) Field of Classification Search
CPC . H01B 1/02; H01B 1/026; H01B 1/08; H01B 1/20; H01B 1/22; C09J 9/02; C09J 11/04; C09D 5/24; C09D 11/52; B22F 1/0081; B22F 1/02; C09K 9/02; C08K 2003/0806; C08K 2003/085; C08K 2008/2231; C08K 2008/2296; C08K 2201/001; C08K 2201/003; C08K 2205/005; C08K 2003/2231; C08K 2003/2255; C08K 2003/2293; C08K 2003/2296; C08K 2201/005; C08K 2201/014
See application file for complete search history.

(56) References Cited

U.S. PATENT DOCUMENTS

| 5,021,304 A | 6/1991 | Ruka et al. |
| 5,654,096 A | 8/1997 | Yamada et al. |
| 5,750,249 A * | 5/1998 | Walther ............... B05D 5/12 252/512 |
| 6,642,297 B1 | 11/2003 | Hyatt et al. |
| 7,262,511 B2 | 8/2007 | Osako et al. |
| 7,408,263 B2 * | 8/2008 | Meth ................. H01R 4/04 257/783 |
| 10,056,505 B2 | 8/2018 | Rantala |
| 2006/0038304 A1 | 2/2006 | Osako et al. |
| 2007/0018315 A1 * | 1/2007 | Craig ................. C08G 59/3209 257/734 |
| 2013/0069014 A1 | 3/2013 | Lee et al. |
| 2013/0224474 A1 | 8/2013 | Theunissen et al. |
| 2014/0030658 A1 | 1/2014 | Kuroki et al. |
| 2014/0178671 A1 | 6/2014 | Dreezen et al. |
| 2014/0264191 A1 * | 9/2014 | Rantala ........... H01L 31/022425 252/513 |

FOREIGN PATENT DOCUMENTS

| CN | 100407340 C | 7/2008 |
| CN | 101918505 A | 12/2010 |
| CN | 101960374 A | 1/2011 |
| CN | 102470438 A | 5/2012 |
| CN | 102471651 A | 5/2012 |
| CN | 102576766 A | 7/2012 |
| CN | 102723121 A | 10/2012 |
| CN | 102807838 A | 12/2012 |
| CN | 103108932 A | 5/2013 |
| CN | 103328596 A | 9/2013 |
| CN | 103347974 A | 10/2013 |
| DE | 10148055 A1 | 7/2002 |
| EP | 0388558 A2 | 9/1990 |
| EP | 0586003 A2 | 3/1994 |
| EP | 2455947 A1 | 5/2012 |
| JP | 10-279902 A | 10/1998 |
| JP | 2007-207589 A | 8/2007 |
| JP | 2015-133301 A | 7/2015 |
| KR | 20040058202 A * | 7/2004 ............... H01B 1/22 |
| WO | 2011/152404 A1 | 12/2011 |

(Continued)

OTHER PUBLICATIONS

English machine translation of Shimizu et al. (KR 2004-0058202 A) (Year: 2004).*
PCT International Search Report for Application No. PCT/CN2015/088445; Gao, Feng, Authorized Officer; ISA/CN; May 17, 2016.
PCT International Search Report for Application No. PCT/CN2015/088444; Kong, Deming, Authorized Officer; ISA/CN; May 16, 2016.
PCT International Search Report for Application No. PCT/CN2015/088370; Lu, Shiyan, Authorized Officer; ISA/CN; Mar. 2, 2016.
Xiaofei, Liu, et al., "Research Progress on Transparent Conductive Films", Laser & Optoelectronics Progress, 2012, vol. 49, pp. 26-35.
Zhaolog, Yi; "Equipment Environmental Engineering, 2nd edition", Beihang University Press, 2017, pp. 183.

*Primary Examiner* — Harold Y Pyon
*Assistant Examiner* — Matthew Dias

(57) ABSTRACT

Disclosed herein are electrically conductive adhesives (ECA) comprising: (a) organic binder, (b) electrically conductive powders comprised of silver particles and surface coated copper particles, and optional (c) solvent.

17 Claims, No Drawings

(56) References Cited

FOREIGN PATENT DOCUMENTS

WO      2014/010524  A1    1/2014
WO      2014/140430  A2    9/2014

\* cited by examiner

Or, the copper cores have a particle size distribution D50 ranging from about 0.5-20 μm.

ELECTRICALLY CONDUCTIVE ADHESIVES

FIELD OF THE INVENTION

The invention relates to novel electrically conductive adhesives comprising silver particles and coated copper particles.

BACKGROUND OF THE INVENTION

Electrically conductive materials are used for a variety of purposes in the fabrication and assembly of electronic devices, integrated circuits, semiconductor devices, passive components, solar cells, and/or light emitting diodes.

In general, electrically conductive adhesives (ECAs) provide a mechanical bond between two surfaces and conduct electricity. Typically, ECA formulations are made of organic binder resins filled with electrically conductive metal fillers. The binder resins generally provide a mechanical bond between two substrates, while the electrically conductive fillers generally provide the desired electrical interconnection.

Typical electrically conductive adhesives require high loadings of electrically conductive fillers which are normally made from expensive conductive metals, such as silver. Silver-coated metal fillers, e.g. silver-coated copper fillers also have been developed and used in the art. However, the electrical conductivity of adhesive formulations, comprising silver-coated fillers is often significantly reduced compared with formulations based on filler materials made of silver.

Hence, there is still a need to develop new conductive fillers for electrically conductive adhesives to reduce the use of expensive conductive metals, such as silver, and to provide good electrical conductivity.

BRIEF SUMMARY OF THE INVENTION

Provided herein is an electrically conductive adhesive comprising: (a) organic binder, (b) electrically conductive powders, and optional (c) solvent, wherein, i) the electrically conductive powders comprises coated copper particles and silver particles; ii) the coated copper particles are comprised of copper cores that are surface coated with a coating composition, the coating composition comprising conductive oxide; and iii) the weight ratio of the electrically conductive powders to the organic binder is in the range of about 95:5-60:40.

In one embodiment of the electrically conductive adhesive, the weight ratio of the electrically conductive powders to the organic binder is in the range of about 95:5-70:30.

In further embodiment of the electrically conductive adhesive, the weight ratio of the electrically conductive powders to the organic binder is in the range of about 95:5-72:28.

In a yet further embodiment of the electrically conductive adhesive, the weight ratio of the coated copper particles to the silver particles is in the range of about 5:95-97:3.

In a yet further embodiment of the electrically conductive adhesive, the weight ratio of the coated copper particles to the silver particles is in the range of about 5:95-90:10.

In a yet further embodiment of the electrically conductive adhesive, the weight ratio of the coated copper particles to the silver particles is in the range of about 10:90-80:20.

In a yet further embodiment of the electrically adhesive, the copper cores have a particle size distribution D50 ranging from about 0.08-50 μm. Or, the copper cores have a particle size distribution D50 ranging from about 0.5-35 μm. Or, the copper cores have a particle size distribution D50 ranging from about 0.5-20 μm.

In a yet further embodiment of the electrically adhesive, the conductive oxide is selected from the group consisting of metal oxides, doped metal oxides, and combinations of two or more thereof.

In a yet further embodiment of the electrically adhesive, the conductive oxide is selected from the group consisting of selected from the group consisting of antimony doped tin oxide (ATO), indium tin oxide (ITO), gallium doped zinc oxide (GZO), aluminum doped zinc oxide (AZO), fluorine doped tin oxide (FTO), and combinations of two or more thereof.

In a yet further embodiment of the electrically conductive adhesive, the organic binder comprises an organic material selected from the group consisting of thermoset resins, thermoplastic resins, elastomers, and combinations of two or more thereof.

In a yet further embodiment of the electrically conductive adhesive, the organic binder further comprises at least one cross-linking agent.

In a yet further embodiment of the electrically conductive adhesive, the optional solvent is included at a balance amount.

Further provided herein is a bonded assembly comprising two substrates aligned in a spaced apart relationship, each of which having an inwardly facing surface and an outwardly facing surface, wherein, the inwardly facing surfaces of each of the two substrates are bonded by an electrically conductive bond, and wherein, the electrically conductive bond is formed by curing the electrically conductive adhesive described above.

Yet further provided herein is an article comprising the bonded assembly described above.

In one embodiment, the article is selected from the group consisting of electronic devices, integrated circuits, semiconductor devices, solar cells, and light emitting diodes.

Yet further provided herein is a method for forming a bonded assembly comprising, which comprises: a) providing two substrates aligned in a spaced apart relationship, each of which having an inwardly facing surface and an outwardly facing surface; b) placing the electrically conductive adhesive described above between the inwardly facing surfaces of each of the two substrates; and c) curing the electrically conductive adhesive to form an electrically conductive bond between the two substrates.

DETAILED DESCRIPTION OF THE INVENTION

Disclosed herein are electrically conductive adhesives (ECA) comprising: (a) organic binder, (b) electrically conductive powders comprised of silver particles and surface coated copper particles, and optional (c) solvent.

Silver Particles

The silver particles used herein may be pure silver, or a silver alloy with copper, palladium, gold, mercury, zinc, tin, indium, boron, iridium, nickel, aluminum, silicon, iron, manganese, germanium, tungsten, carbon, cadium, etc., or mixture thereof. Among them, silver alloys with copper, palladium, gold, nickel, zinc, tin, or mixtures thereof may be used. In those embodiments, wherein silver is in the form of a silver alloy, the silver alloy need to contain at least about 50 wt % silver in one embodiment, at least about 60 wt % silver in another embodiment, or at least about 70 wt % silver in yet another embodiment.

A skilled person would recognize that the choice of raw materials could unintentionally include impurities that may be incorporated into the silver particles during processing. For example, the impurities may be present in the range of hundreds to thousands of parts per million. Impurities commonly occurring in industrial metals used herein are known to one of ordinary skill.

The silver particles used herein can be spherical, flaky, or irregular in shape. In one embodiment, the silver cores used herein are a mixture of spherically shaped and flaky shaped particles. Spherical shaped particles have an isometric shape, i.e. a shape, in which, generally speaking, the extension (particle size) is approximately the same in any direction. In particular, for a particle to be isometric, the ratio of the maximum and minimum length of chords intersecting the geometric center of the convex hull of the particle should not exceed the ratio of the least isometric regular polyhedron, i.e. the tetrahedron. Particle shapes are often times defined by aspect ratios, which is expressed by particle major diameter/particle thickness. In accordance with the present disclosure, the spherically shaped silver particles may have an aspect ratio ranging from about 1-3, or from about 1-2, while, the flaky silver particles used herein may have an aspect ratio ranging from about 5-1000, or about 5-600, or about 5-200.

Coated Copper Particles

The coated copper particles used herein are formed of copper cores that are surface coated with a coating composition, in which the coating composition comprises one or more conductive oxides.

The copper cores can be pure copper, or a copper alloy with nickel, silver, aluminum, zinc, tin, silicon, iron, manganese, germanium, boron, or mixture thereof. Among them, copper alloys with zinc, tin, aluminum, silicon, or mixtures thereof are preferred. In those embodiments, wherein the copper core is in the form of a copper alloy, the copper alloy need to contain at least about 70 wt % copper in one embodiment, at least about 75 wt % copper in another embodiment, or at least about 80 wt % copper in yet another embodiment.

A skilled person would recognize that the choice of raw materials could unintentionally include impurities that may be incorporated into the copper core during processing. For example, the impurities may be present in the range of hundreds to thousands of parts per million. Impurities commonly occurring in industrial metals used herein are known to one of ordinary skill.

The copper cores used herein may be of any shape. For example, it can be spherical, flaky, or irregular in shape. In one embodiment, the copper cores used herein are spherically shaped. In accordance with the present disclosure, such spherically shaped copper cores may have an aspect ratio ranging from about 1-3, or from about 1-2.

In addition, the copper cores used herein may have a D50 of particle size distribution from about 0.08-50 µm, or about 0.5-35 µm, or about 0.5-20 µm. Particle size distribution D50 is also known as the median diameter or the medium value of the particle size distribution, it is the value of the particle diameter at 50% in the cumulative distribution. For example, if D50=5.4 µm, then 50 volume % of the particles in the sample have an averaged diameter larger than 5.4 µm, and 50 volume % of the particles have an averaged diameter smaller than 5.4 µm. Particle size distribution D50 of a group of particles can be determined using light scattering methods following, for example, ASTM B822-10.

The conductive oxides used herein may be metal oxides or doped metal oxides. By "doped metal oxides", it is meant that one element within the base metal oxides is partially replaced by a different element (also called doping agent or dopant). And the doping level is the amount of the dopant expressed as atom percentage, based on the total amount of the one element in the base metal oxide. In other words, in doped metal oxide "$M_xO_y$:z at % D", z at % of element M or element O in the base metal oxide MxOy is replaced by D. For example, in $SnO_2$: 10 at % Sb, 10 at % of Sn in base oxide $SnO_2$ was replaced by Sb, while in $SnO_2$: 2 at % F, 2 at % of O in base oxide $SnO_2$ was replaced by F In one embodiment, the conductive oxides used herein are doped metal oxides. For example, the metal oxides may be selected from tin oxide ($SnO_2$), zinc oxide (ZnO), indium oxide ($In_2O_3$), cadmium oxide (CdO), nickel oxide (NiO), chromium oxide ($Cr_2O_3$), molybdenum oxide ($MoO_3$), etc., while the doping agents may be selected from antimony, indium, gallium, fluorine, aluminum, lithium, iron, phosphorous, arsenic, boron, silicon, germanium, titanium, yttrium, zirconium, hafnium, scandium, etc. And, the doping level may be up to about 20 at %, or about 0.1-15 at %. Exemplary doped oxides useful herein may include, without limitation, antimony doped tin oxide ($SnO_2$:Sb, or ATO), indium tin oxide ($In_2O_3$:Sn, or ITO), gallium doped zinc oxide (ZnO:Ga, or GZO), aluminum doped zinc oxide (ZnO:Al, or AZO), fluorine doped tin oxide ($SnO_2$:F, or FTO), and combinations of two or more thereof.

In accordance with the present disclosure, the copper cores may be surface coated with about 0.05-4.8 parts by weight, or about 0.3-4.8 parts by weight, or about 0.3-4 parts by weight of the coating composition, relative to 100 parts by weight of the spherical copper core. And the coating composition is attached to and covers at least about 50%, or at least about 60%, or at least about 80% of the surface area of the spherical copper cores. Also, the thickness of the coating composition over the spherical copper cores may range from about 1-400 nm, or about 1-200 nm, or about 1-100 nm.

Further, in addition to the one or more conductive oxides, the coating composition may further contain other suitable conductive materials, such as, metals, conductive or semiconductive inorganic compounds (e. g. nitrides, carbides, sulfides, phosphides, germanides, selenides, etc.), conductive polymers (e.g. poly(p-phenylene vinylene) (PPV), poly (3,4-ethylenedioxythiophene) (PEDOT), etc.), non-metallic elementals (e.g. carbon, boron, phosphorus, sulfur, germanium, silicon, selenium, etc.).

The coated copper particles may be manufactured by any suitable process, for example, wet coating, dry coating, melt coating, encapsulation, vapor processing, plasma processing, or a combination of two or more of these techniques. The coating equipment includes fluidized-bed coater, spouted bed coater, wurster, rotating drum, pan and disc coater, fluidized bed reactor with chemical vapor deposition, and plasma enhanced chemical vapor deposition.

Worth mentioning is that prior to the coating process, it is preferred that the surface of the spherical copper cores are cleaned to remove surface oxides. Such cleaning process may include, without limitation, thermal annealing, chemical reaction, mechanical polishing, etc.

Organic Binders

In forming the ECA disclosed herein, the electrically conductive powders are dispersed in the matrix formed by organic binder. The organic binder may be any organic material or organic material composition with rheological properties that could provide stable dispersion of the coated particles, appropriate viscosity and thixotropy for applying the conductive adhesive to a substrate, appropriate wettability on the substrate, good adhesion to the substrate, and appropriate curing profile to meet proper processing conditions.

Suitable organic materials may be small molecules, oligomers, or polymers. For example, thermoset resins (e.g. epoxy, phenolic resin, polyimide, cyanate ester, silicone resin, maleimide, saturated polyester, etc.), thermoplastic resins (e.g. acrylic, polyurethane, unsaturated polyester, etc.), or elastomers (e.g. fluoroelastomer, silicone rubber, natural rubber, butyl rubber, polyisobutylene rubber, etc.), or mixtures thereof, may be used herein.

The organic binders also may contain crosslinking agents. Suitable crosslinking agents may include, without limitation, phenol, amines, anhydrides, modified amines, polyfunctional aziridines, silicone epoxides, peroxides, aliphatic azo compounds, ammonium carbonate, organosilane, etc.

The organic binders may further contain thickeners, stabilizers, surfactants, de-gas agents, and/or other common additives.

Solvent

In some embodiments, solvents also may be included in the ECA for improved filler dispersion and/or processability. Suitable solvents may include, without limitation, alcohol (e.g., ethanol), ketone (e.g., methyl isobutyl ketone, methyl ethyl ketone, diisobutyl ketone, or acetone), ether, esters, organic acids, amines, alkanes, benzenes, aldehydes, amides, and mixtures thereof. It is within any skilled person's ability to choose suitable solvents or solvent mixtures for the different binder systems.

Electrically Conductive Adhesives (ECA)

The ECA disclosed herein comprise (a) organic binder, (b) electrically conductive powders comprised of the silver particles and the surface coated copper particles (as described above), and optional (c) solvent.

The conductive powders used herein comprise or are formed of mixtures of the silver particles and the surface coated copper particles. The weight ratio of the surface coated copper particles to the silver particles may be in the range of about 5:95-97:3 in one embodiment, or about 5:95-90:10 in another embodiment, or 10:90-80:20 in yet another embodiment. In the ECA, the weight ratio of the electrically conductive powders to the organic binder may be in the range of 95:5-60:40 in one embodiment, or about 95:5-70:30 in another embodiment, or about 95:5-72:28 in yet another embodiment.

In accordance with the present disclosure, the optional solvent may be included in a balance amount.

Further, the ECA disclosed herein may further comprise other suitable additives, such as, metal powders, conductive carbons (e.g. carbon black, Graphene, carbon nanotubes, etc.), conductive polymers (e.g. poly(p-phenylene vinylene) (PPV), poly(3,4-ethylenedioxythiophene) (PEDOT), etc.), conductive or semi-conductive inorganic compound powders (e. g. nitrides, carbides, sulfides, phosphides, germanides, selenides, etc.), non-metallic elements (e.g. boron, phosphorus, sulfur, germanium, silicon, selenium, etc.), coupling agents (e.g. silane), and insulating polymeric or inorganic powders.

The ECA may be prepared by any suitable process. For example, the ECA may be prepared by simply mixing and dispersing the silver particles and the surface coated copper particles in the organic binder or the organic binder with solvent.

Electrically Conductive Bonds and Articles Comprising the Same

The ECA disclosed herein, when cured, can form electrically conductive bonds between two substrates. Such electrically conductive bonds provide electrically conductive connections between the two substrates.

The ECA disclosed herein can be cured by any suitable curing process, such as, thermal curing or radiation curing. For example, thermal curing may be conducted using infrared, laser, microwave, hot shoe, hot gas, flame, oven, induction, ultrasonic, resistance heating, thermal additive based heating, autoclave, vacuum laminator, etc., while radiation curing may be conducted using high energy electromagnetic radiation (e.g., gamma ray, X-ray, ultraviolet, accelerated electron beams, etc.). For example, the ECA disclosed herein may be cured in about 0.1 sec to 180 min at a temperature of about 20-250° C. in one embodiment, or about 20-220° C. in another embodiment, or about 20-200° C. in yet another embodiment.

As demonstrated by the examples below, electrically conductive bonds formed by the ECA that has the conductive silver powders partially replaced by conductive oxide coated copper particles exhibit very much increased conductivity, when compared to the electrically conductive bonds formed by ECA that has the conductive silver powders partially replaced by silver coated copper particles, at comparable total loadings of the electrically conductive powders.

Thus, also disclosed herein are bonded assemblies comprising two substrates aligned in a spaced apart relationship, each of which having an inwardly facing surface and an outwardly facing surface, wherein between the inwardly facing surfaces of each of the two substrates an electrically conductive bond is formed by the ECA disclosed herein.

Further disclosed herein are articles comprising such bonded assemblies, which include, without limitation, electronic devices, integrated circuits, semiconductor devices, solar cells, and light emitting diodes. The articles also may be other devices employing the ECA disclosed herein, which may be used in a wide variety of applications, including energy production, personal computers, control systems, telephone networks, automotive electronics, displays, semiconductor packages, passive devices, and handheld devices.

EXAMPLES

Electrically Conductive Particles:

Ag: mixture of silver microcrystals and silver flakes (D50=3-5 µm) manufactured by Kunming Noble Metal Electronic Materials Co., Ltd. (China).

Cu/Ag: copper cores (D50=3.1-3.6 µm; aspect ratio=1.05) that were surface coated with various loadings of silver. The particles were manufactured by Ningbo Guangbo New Nanomaterials Stock Co., Ltd. (China) using electroless plating process.

Cu/ATO: copper cores (D50=5.4 µm; aspect ratio=1.12) that were surface coated with various loadings of antimony doped tin oxide (ATO, $SnO_2$: 10 at % Sb) nanoparticles (D50=20-40 nm) by dry coating process in a chamber protected by inert gas (with rotor speed of 7000 rpm and duration of 3 minutes). The copper core particles were purchased from Mitsui Mining & Smelting Co., Ltd. (Japan), while the ATO nanoparticles were purchased from Hangzhou Wanjing New Material Co., Ltd. (China).

Cu/ITO: copper cores (D50=5.4 µm; aspect ratio=1.12) that were surface coated with various loadings of indium doped tin oxide (ITO, $In_2O_3$: 9 at % Sn) nanoparticles (D50=20-40 nm) by dry coating process in a chamber protected by inert gas (with rotor speed of 7000 rpm and duration of 3 minutes). The ITO nanoparticles were purchased from Beijing DK NANO S&T Ltd. (China).

Cu/AZO: copper cores (D50=5.4 μm; aspect ratio=1.12) that were surface coated with various loadings of aluminum doped zinc oxide (AZO, ZnO: 1.6 at % Al) nanoparticles (D50=20-40 nm) by dry coating process in a chamber protected by inert gas (with rotor speed of 7000 rpm and duration of 3 minutes). The AZO nanoparticles were purchased from Beijing DK NANO S&T Ltd. (China).

Cu/GZO: copper cores (D50=5.4 μm; aspect ratio=1.12) that were surface coated with various loadings of gallium doped zinc oxide (GZO, ZnO:2.6 at % Ga) nanoparticles (D50=20-40 nm) by dry coating process in a chamber protected by inert gas (with rotor speed of 7000 rpm and duration of 3 minutes). The GZO nanoparticles were purchased from Forsman Scientific (Beijing) Co., Ltd. (China).

Electrically Conductive Adhesives (ECA):

Various ECAs were prepared as follows: (i) compounding 80 g of Viton® GF 200S resin (a fluoroelastomer obtained from E.I. du Pont de Nemours and Company (U.S.A.) (hereafter "DuPont")), 20 g of Vamac® resin (an ethylene/methyl acrylate copolymer having a Mooney viscosity (ML1+4, 100° C.) of 22, which was obtained from DuPont), 2 g of 1,1-di(t-butylperoxy)-3,3,5-trimethylcyclohexane, 1.5 g of TAIC (triallyl isocyanurate, obtained from DuPont under the trade name Diak™ 7), 0.1 g of butylated hydroxytoluene, 0.1 g of 4,4'-Bis(α, α-dimethylbenzyl) diphenylamine (obtained from Chemtura Corp. (U.S.A.) under the trade name Naugard™ 445), 2 g of MgO in a two roll mill at room temperature for 20 minutes and dissolving 2 g of the above as-made mixture in 3 g of MIBK (methyl isobutyl ketone obtained from Sinopharm Chemical Reagent Co., Ltd. (China)) to form a solution; (ii) adding various amounts of the electrically conductive powders into the solution obtained from step (i); (iii) mixing the mixture by a mixer (manufactured by Thinky USA Inc. (U.S.A.) with the model name ARE-310) at 2000 rpm for 1 min; (iv) repeating the mixing step 2 more times to obtain the electrically conductive adhesive (ECA).

Measurement of Resistivity:

To determine the resistivity of the ECA as prepared above, the ECA was blade-casted on an insulating glass slide (25.4×76.2×1.2 mm) to form a 50-80 μm thick ECA bar (4 mm wide and 40 mm long); dried at 70° C. for 1 min and 100° C. for 5-10 min; and cured in vacuum laminator at about 145-165° C. for about 30-60 min.

The sheet resistance of the cured ECA bar was measured by a four-probe method using a sheet resistivity meter (manufactured by Napson Corp. (Japan) with the model name QT-70/5601Y) and the thickness of the cured ECA bar was measured using a Veeco Surface Profiler (manufactured by Veeco Instruments Inc. with the model name Dektak XT). The resistivity of the cured ECA bar was calculated by the equation below and tabulated in Table 1:

$$\rho(\text{Resistivity}) = \text{sheet resistance} \times \text{thickness} \times \text{geometry correction} = \text{sheet resistance} \times \text{thickness} \times 3.2248/4.5324$$

As demonstrated by the examples below, electrically conductive bonds formed by the ECA that has the conductive silver powders partially replaced by conductive oxide coated copper particles (E1-E17) exhibit very much increased conductivity, when compared to the electrically conductive bonds formed by ECA that has the conductive silver powders partially replaced by silver coated copper particles (CE1-CE6, CE9-CE10, and CE12-CE13), at comparable total loadings of the electrically conductive powders.

TABLE 1

| Samples | Coated Cu Particles ([1]coating ratio) | Weight Ratio of coated Cu particles:Ag particles | Weight Ratio of Electrically conductive powders:Binder | [2]Resistivity (ohm-cm) |
|---|---|---|---|---|
| CE1 | Cu/Ag (0.4 phr) | 75:25 | 80:20 | over limit |
| CE2 | Cu/Ag (1.4 phr) | 75:25 | 80:20 | over limit |
| CE3 | Cu/Ag (3 phr) | 75:25 | 80:20 | 7.43E-03 |
| CE4 | Cu/Ag (4.5 phr) | 75:25 | 80:20 | 4.50E-03 |
| CE5 | Cu/Ag (5 phr) | 75:25 | 80:20 | 4.70E-03 |
| CE6 | Cu/Ag (5.5 phr) | 75:25 | 80:20 | 4.45E-03 |
| E1 | Cu/ATO (0.1 phr) | 75:25 | 80:20 | 1.97E-03 |
| E2 | Cu/ATO (0.2 phr) | 75:25 | 80:20 | 1.90E-03 |
| E3 | Cu/ATO (0.4 phr) | 75:25 | 80:20 | 8.67E-04 |
| E4 | Cu/ATO (0.8 phr) | 75:25 | 80:20 | 8.54E-04 |
| E5 | Cu/ATO (1.4 phr) | 75:25 | 80:20 | 9.62E-04 |
| E6 | Cu/ATO (3 phr) | 75:25 | 80:20 | 8.03E-04 |
| E7 | Cu/ATO (4.5 phr) | 75:25 | 80:20 | 1.01E-03 |
| CE7 | Cu/ATO (1.4 phr) | 75:25 | 55:45 | over limit |
| E8 | Cu/ATO (1.4 phr) | 75:25 | 65:35 | 8.05E-03 |
| E9 | Cu/ATO (1.4 phr) | 75:25 | 75:25 | 1.89E-03 |
| E10 | Cu/ATO (1.4 phr) | 75:25 | 82:18 | 7.01E-04 |
| E11 | Cu/ATO (1.4 phr) | 75:25 | 85:15 | 3.92E-04 |
| E8 | Cu/ITO (0.8 phr) | 75:25 | 80:20 | 8.75E-04 |
| E9 | Cu/ITO (1.4 phr) | 75:25 | 80:20 | 1.32E-03 |
| E10 | Cu/AZO (0.8 phr) | 75:25 | 80:20 | 8.64E-04 |
| E11 | Cu/GZO (0.8 phr) | 75:25 | 80:20 | 7.03E-04 |
| CE8 | Cu/Ag (1.4 phr) | 100:0 | 80:20 | over limit |
| CE9 | Cu/Ag (1.4 phr) | 90:10 | 80:20 | over limit |
| CE10 | Cu/Ag (1.4 phr) | 85:15 | 80:20 | over limit |
| CE11 | Cu/ATO (1.4 phr) | 100:0 | 80:20 | 1.03E+00 |
| E12 | Cu/ATO (1.4 phr) | 85:15 | 80:20 | 3.89E-02 |
| E13 | Cu/ATO (1.4 phr) | 95:5 | 80:20 | 8.45E-02 |
| CE12 | Cu/Ag (1.4 phr) | 97:3 | 85:15 | 1.65E+02 |
| CE13 | Cu/Ag (1.4 phr) | 99:1 | 85:15 | over limit |
| CE14 | [3]Cu/ATO (1.4 phr) | 100:0 | 85:15 | 6.22E-02 |
| E14 | Cu/ATO (1.4 phr) | 85:15 | 85:15 | 1.43E-03 |
| E15 | Cu/ATO (1.4 phr) | 95:5 | 85:15 | 2.98E-03 |
| E16 | Cu/ATO (1.4 phr) | 97:3 | 85:15 | 4.58E-03 |
| E17 | Cu/ATO (1.4 phr) | 99:1 | 85:15 | 1.05E-02 |

[1]Coating Ratio was recorded using phr (per hundred rubber) value, or parts by weight of the coating material, relative to 100 parts by weight of the particle core;
[2]Resistivity was recorded as over limit when the resistivity was 1.0E+06 ohm or higher at 80-100 μm thickness;
[3]The rotor speed was set at 5500 rpm when the coated particles were prepared.

What is claimed is:

1. An electrically conductive adhesive comprising: (a) an organic binder, (b) electrically conductive powders, and (c) an optional solvent, wherein,
   i) the electrically conductive powders comprises coated copper particles and silver particles;
   ii) the coated copper particles are comprised of copper cores that are surface coated with a coating composition, the coating composition comprising at least one conductive oxide;
   iii) the weight ratio of the electrically conductive powders to the organic binder is in the range of about 95:5-60:40;
   iv) the weight ratio of the coated copper particles to the silver particles is in the range of 5:95-97:3; and
   v) the at least one conductive oxide is a doped metal oxide comprising a metal oxide and a doping agent, where
      a) the metal oxide of the doped metal oxide is selected from tin oxide ($SnO_2$), zinc oxide (ZnO), indium oxide ($In_2O_3$), cadmium oxide (CdO), nickel oxide (NiO), chromium oxide ($Cr_2O_3$), and molybdenum oxide ($MoO_3$); and b) the doping agent of the doped metal oxide is selected from antimony, indium, gallium, fluorine, aluminum, lithium, iron, phosphorous, arsenic, boron, silicon, germanium, titanium, yttrium, zirconium, hafnium, and scandium.

2. The electrically conductive adhesive of claim 1, wherein the weight ratio of the electrically conductive powders to the organic binder is in the range of about 95:5-70:30.

3. The electrically conductive adhesive of claim 2, wherein the weight ratio of the electrically conductive powders to the organic binder is in the range of about 95:5-72:28.

4. The electrically conductive adhesive of claim 1, wherein, the weight ratio of the coated copper particles to the silver particles is in the range of about 5:95-90:10.

5. The electrically conductive adhesive of claim 4, wherein, the weight ratio of the coated copper particles to the silver particles is in the range of about 10:90-80:20.

6. The electrically conductive adhesive of claim 1, wherein, the copper cores have a particle size distribution D50 ranging from about 0.08-50 μm.

7. The electrically conductive adhesive of claim 6, wherein, the copper cores have a particle size distribution D50 ranging from about 0.5-35 μm.

8. The electrically conductive adhesive of claim 7, wherein, the copper cores have a particle size distribution D50 ranging from about 0.5-20 μm.

9. The electrically conductive adhesive of claim 1, wherein, the at least one conductive oxide is selected from the group consisting of selected from the group consisting of antimony doped tin oxide (ATO), gallium doped zinc oxide (GZO), aluminum doped zinc oxide (AZO), fluorine doped tin oxide (FTO), and combinations of two or more thereof.

10. The electrically conductive adhesive of claim 1, wherein, the organic binder comprises an organic material selected from the group consisting of thermoset resins, thermoplastic resins, elastomers, and combinations of two or more thereof.

11. The electrically conductive adhesive of claim 10, wherein, the organic binder further comprises at least one cross-linking agent.

12. The electrically conductive adhesive of claim 1, wherein the optional solvent is included at a balance amount.

13. A bonded assembly comprising two substrates aligned in a spaced apart relationship, each of which having an inwardly facing surface and an outwardly facing surface, wherein, the inwardly facing surfaces of each of the two substrates is bonded by an electrically conductive bond, and wherein, the electrically conductive bond is formed by curing the electrically conductive adhesive recited in claim 1.

14. An article comprising the bonded assembly of claim 13.

15. The article of claim 14, wherein the article is selected from the group consisting of an electronic device, an integrated circuit, a semiconductor device, a solar cell, and a light emitting diode.

16. A method for forming a bonded assembly comprising:
a) providing two substrates aligned in a spaced apart relationship, each of which having an inwardly facing surface and an outwardly facing surface;
b) placing the electrically conductive adhesive recited in claim 1 between the inwardly facing surfaces of each of the two substrates; and
c) curing the electrically conductive adhesive to form an electrically conductive bond between the two substrates.

17. An electrically conductive adhesive comprising: (a) an organic binder, (b) electrically conductive powders, and (c) an optional solvent, wherein,
i) the electrically conductive powders comprise coated copper particles and silver particles;
ii) the coated copper particles are comprised of copper cores that are surface coated with a coating composition, the coating composition comprising at least one conductive oxide;
iii) the weight ratio of the electrically conductive powders to the organic binder is in the range of about 95:5—60:40;
iv) the weight ratio of the coated copper particles to the silver particles is in the range of 5:95—97:3; and
v) the at least one conductive oxide is tin doped indium oxide.

* * * * *